April 3, 1962 E. A. ZUZELO 3,027,885
MASONRY SAW WORK-CONVEYING CART
Filed June 16, 1959
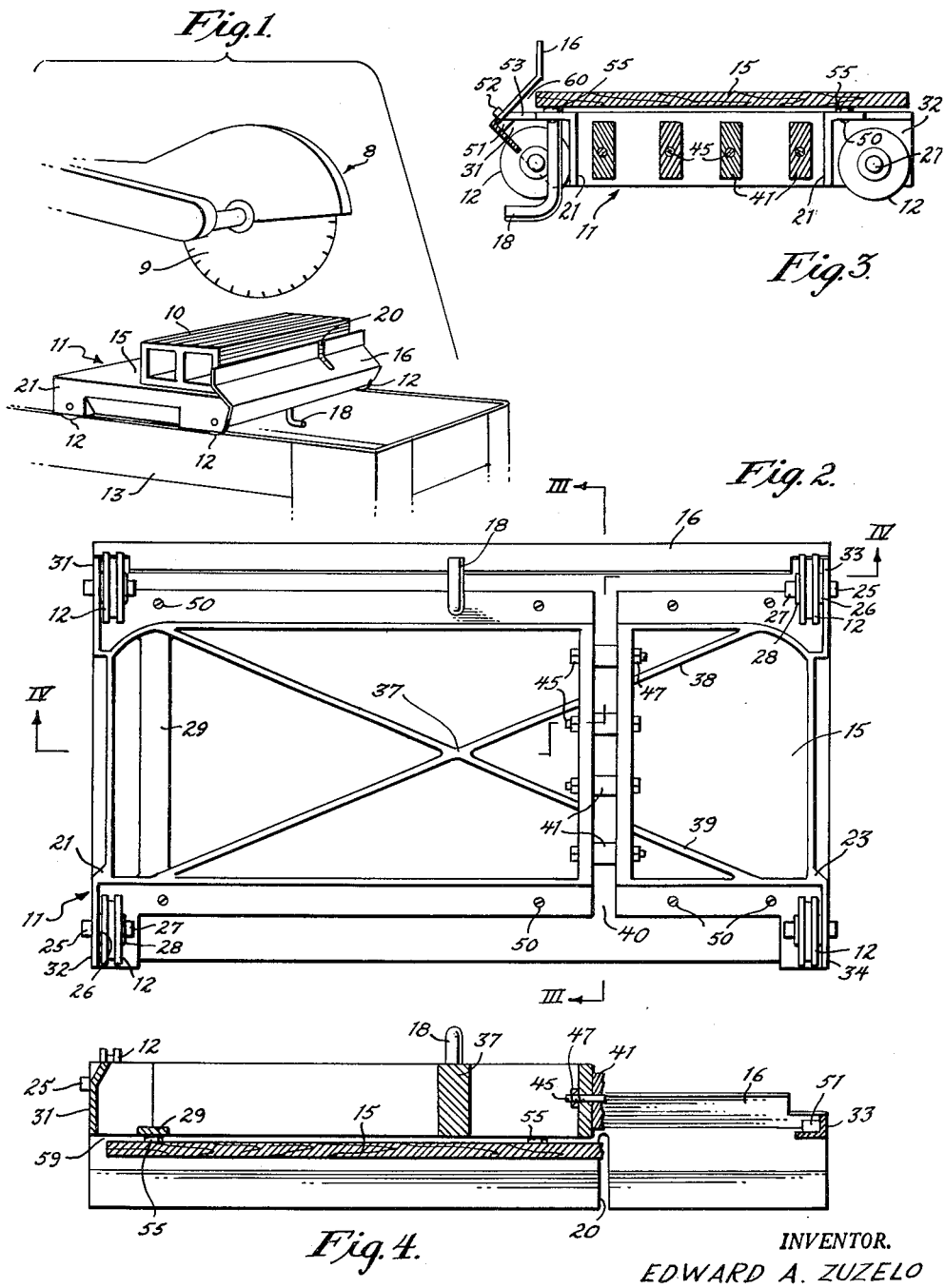
INVENTOR.
EDWARD A. ZUZELO
BY Charles A. McRure
ATTORNEY.

3,027,885
MASONRY SAW WORK-CONVEYING CART
Edward A. Zuzelo, 652 Broadacres Road, Narberth, Pa.
Filed June 16, 1959, Ser. No. 820,658
8 Claims. (Cl. 125—13)

This invention relates to a conveyor cart adapted to carry material to be worked upon into the path of a working tool, concerning especially such a cart for use in a masonry saw to support brick, concrete, tile, or similar material to be cut with the cutting blade of the saw.

It is customary in the sawing of masonry articles, of such size, shape, and weight as to be portable, to place the article to be sawed on a conveyor cart adapted to move to and fro underneath the cutting blade of the saw, which customarily is depressible in convenient manner to intercept and cut the article on the cart. The blades or wheels used as cutting tools in masonry saws are composed of very hard particles of carbides, diamonds, or other natural or synthetic abrasives, and they are capable of cutting through the conveyor cart, as well as through the articles supported on it. Carelessness upon the part of the operator of such a saw is conducive to undue shortening of the useful life of the carts because of contact with the cutting blade; such contact is also deleterious to the blades themselves, inasmuch as the carts normally are made of steel or the like.

A primary object of the present invention is prolongation of the useful life of conveyor carts used to support articles to be cut or similarly worked. An object is provision of an improved conveyor cart for masonry saws. A particular object is construction of a conveyor cart adapted to carry articles to be cut or similarly worked, and having removable members located in the path of the cutting or similar tool. Other objects of the present invention, together with means and methods for accomplishing the various objects, will be apparent from the following description and the accompanying diagrams.

FIG. 1 is a perspective of the conveyor cart of this invention shown in operating position in conjunction with a masonary saw (shown fragmentarily); FIG. 2 is a bottom plan of the same cart; FIG. 3 is a longitudinal vertical section taken at III—III of FIG. 2; and FIG. 4 is a transverse vertical section taken at IV—IV of FIG. 2.

In general, the objects of the present invention are accomplished by providing, in a conveyor cart adapted for use with a cutting blade movable to intercept the cart, a bed of severable material adapted to support an article to be cut on the cart, a frame comprising a pair of frame pieces located on opposite sides of the locus of interception of the cart by the blade, and connecting means joining the pair of frame pieces to one another and including severable spacing means joined to and terminating at the near side edges of the frame pieces and holding the frame pieces apart from one another on opposite sides of the locus of interception of the cart by the blade, the frame otherwise being essentially free of components in the path of interception by the blade. The invention comprehends of such a conveyor cart, a track therefor, and a saw blade suspended over the track and reciprocable into the path of the cart along the track to intercept the cart along such locus.

FIG. 1 shows conveyer cart 11 carrying tile 10 below cutting blade or wheel 9 of saw 8 (shown only fragmentarily). Wheels 12 of the cart ride on tracks provided by the top side edges of frame 13 (also shown only fragmentarily). The other principal parts of the cart visible in this view include bed 15 on which the visible piece of tile is supported, backing strip 16 at the front edge of the cart, slotted at the top by slot 20 along the locus of interception of the cart by the blade, stop 18 protruding frontward from underneath the backing strip, and frame piece 21 supporting the left end of the bed and the backing strip, as well as pair of wheels 12 at the left.

FIG. 2 shows the bottom of the cart of FIG. 1. Frame piece 21, which is generally rectangular in outline, has flanges 31 and 32 at the front and rear left edges, respectively. Right frame piece 23, also visible in this view, has corresponding front and rear flanges 33 and 34, respectively, at its right edge. Each flange is bored to receive a bolt 25, and each bolt carries one of the wheels, spaced from the flange by washer 26 and from nut 27 by washer 28. The bed is held onto the frame pieces by plurality of screws 50 extending upward through apertures at intervals in the flanged upper edges of the frame pieces. The frame is cross-braced, each frame piece containing part of the cross brace, major part 37 (including the cross-over of the brace) being located within the outline of the left frame piece, which is appreciably wider than the right frame piece within which minor parts 38, 39 of the cross brace appear. The left frame piece also has reinforcing strip 29 extending from front to rear at the left ends of the cross brace, just inside the left edge of the frame piece.

The right-hand edge of the left frame piece and the left-hand edge of the right frame piece extend parallel to one another but are held apart by a plurality of spacers 41. Each spacer is held in place by one of bolts 45 extending through apertures bored in the respective edge pieces of the frame and retained by one of nuts 47. Space 40 so provided between the neighboring edges of the respective frame pieces is aligned with slot 20 (visible in FIG. 1) of the backing strip.

FIG. 3 shows cart 11 in longitudinal section, viewed to the left from the space between the frame pieces, i.e., from along the locus of interception of the cart by the blade. Of course, the spacers and the bolts appear in transverse section, as do the bed and a portion of the backing strip (this view coinciding with the slotted portion of the strip). Visible in this view are washers 55 between the flanged top edges of the frame pieces and located about screws 50, which hold the bed onto the frame. Also visible is bolt 52 threaded through the backing strip and into boss 51 located at extended left front corner 53 (adjoining flange 31) of frame piece 21 to hold the backing strip in place, cooperating with a corresponding boss and bolt (not visible) at the corresponding corner adjoining front flange 33 of the right frame piece. Drainage space 60 exists between the front edge of the bed and the backing strip.

The backing strip itself is made up of three narrow contiguous bands, the middle band adjoining the other two, and the middle and lower bands being oriented at an acute angle with respect to the surface of the bed, which is substantially horizontal, thereby presenting an approximately right-angled corner toward the operator at the front of the apparatus. The top band of the backing strip is oriented perpendicular to the bed and above the front edge thereof.

FIG. 4 shows the same cart in transverse section looking toward the front from about the center of the larger frame piece and from about the front edges of the bed and the smaller frame piece. Portions of elements previously described and shown appear in section in this view, which also shows the three bands of the backing plate in full view from the rear. The side edges of the bed are seen to stop short of the sides of the frame pieces, thereby providing additional drainage spaces at both the left and right, only space 59 at the left being visible in this view. This view is inverted for clarity of the showing.

Operation of this apparatus is readily understood. In a masonry saw, as suggested in FIG. 1, the cart supports an article to be cut and is adapted to be moved to and from under the cutting blade, which itself is adapted to be depressed into contact with the article to be cut. With successive passes of the cart back and forth, the cutting blade can penetrate more and more deeply into the article. If the article to be cut is large with respect to the saw diameter, it can be turned one or more times to present successive uncut surfaces to the blade. In any event, when the article is completely cut there is a risk that the blade will penetrate the bed on which the article was supported. The locus of interception of the blade with the cart may be thought of as a plane extending from front to rear through the cart, inasmuch as the blade reciprocates up and down and the cart reciprocates to and fro. The blade is located, and the cart dimensioned, so that the locus of interception falls within space 40 between the respective frame members.

Severance of the bed, which may be made of plywood or other readily severable natural or synthetic material, if it occurs, is not too serious because both resulting portions of the bed remain screwed to their respective frame pieces, which themselves are uncut. A deeper cut may result in penetration of one or more of the frame spacers, which may be made conveniently of wood, of aluminum or other relatively soft metal, or of plastic, for example. Partial cutting of the spacers is acceptable, as the frame pieces will maintain their relative orientation unless and until the bolts holding the spacers become cut sufficiently deeply to distort them under the weight of the load imposed on the cart. Of course, such an extreme degree of damage is unlikely if adequate care is taken to prevent the blade from penetrating too deeply.

Even if the bolts should be cut in two or nearly so, so that the work bed becomes misaligned and sags and perhaps binds against the sides of the blade, the apparatus of this invention can be restored quickly and readily to full operating condition merely by replacing the severed bolts and fastening the respective frame pieces together again, preferably with new spacers, although in some instances the old spacers might be reusable. The advantage over conventional conveyor carts is obvious; weakening of the conventional full-width frame pieces, which extend transversely across the locus of interception of the cart by the cutting blade or similar tool, normally necessitates replacement of the conventional frame, which is relatively expensive and time-consuming as compared with the simple replacement of bolts according to this invention. The work bed may, but need not, be replaced along with bolts and the spacers to restore the cart to useful condition.

In general, because of its location at the front of the apparatus (nearest the operator), the backing strip will not be cut so deeply as the rest of the cart may be, probably little if any below the bottom of the slot already present in it. However, if it should be severed or buckled a new strip may be bolted on without difficulty. The spacing of the strip away from the front edge of the cart permits water or other lubricant applied to the blade to wash fragments of the cut article and of the blade itself off the work bed, instead of permitting them to pile up and obstruct accurate placement of the article to be cut squarely on the cart.

It will be apparent that more or fewer connecting bolts and spacers may be employed, if desired, and that other pieces of the described and illustrated apparatus embodiment of this invention may be combined (except across the locus of interception) or that one or more of such pieces may be sub-divided into further pieces, as may be convenient, without departing from the inventive concept embodied therein. The advantages and benefits of the present invention will accrue and become most apparent to those undertaking to practice it in its various aspects.

The claimed invention:

1. In a conveyor cart adapted to reciprocate substantially horizontally and to be intercepted by a cutting blade adapted to reciprocate substantially vertically, an improved frame adapted to support a work bed and consisting essentially of a plurality of bed-supporting frame pieces located on opposite sides of the locus of interception of the cart by the blade, readily renewable spacing means independent of the work bed and adapted to hold the frame pieces spaced away from the locus of interception, and means attaching the spacer means to the frame pieces.

2. In a conveyor cart, adapted for use with a cutting blade movable to intercept the cart, the improvement comprising a bed of severable material adapted to support an article to be cut on the cart, a pair of frame pieces attached to the underside of the bed and located on opposite sides of the locus of interception of the cart by the blade, and connecting means joining the pair of frame pieces to one another and including severable spacing means joined to be frame pieces at a level spaced below the underside of the bed and holding the frame pieces apart from one another on opposite sides of the locus of interception of the cart by the blade.

3. In a masonry saw having a rotary blade adapted to be reciprocated substantially vertically into the path of a conveyor cart adapted to reciprocate substantially horizontally under the blade, thereby defining a locus of interception of the cart by the blade, an improved conveyor cart comprising a pair of skeleton frame pieces attached to the underside of the bed and located on opposite sides of the locus of interception of the cart by the blade, the outer edges of the bed on opposite sides of the locus being located laterally nearer the locus of interception than are the respective far side edges of the frame pieces, connecting means joining the pair of frame pieces to one another and including severable spacing means joined laterally to the near side edges of the frame pieces substantially midway of their vertical extent and holding the frame pieces spaced apart from one another on opposite sides of the locus of interception, a backing strip extending above and along an edge of the cart, means connecting the backing strip at a plurality of locations to the frame and including spacing means joined to the frame and to the backing strip and holding the backing strip spaced from the adjacent edges of the bed and the frame pieces.

4. Apparatus comprising a conveyor cart, a track therefor, roller means interposed between the cart and the track and connected to one of them for facilitating movement of the cart along the track, a saw blade suspended over the track and reciprocable into the path of the cart along the track, the cart including a pair of frame pieces joined to and spaced from one another by severable means transversely intercepting the path and including also a work bed supported on the frame pieces above and spaced from the severable means and bridging the path.

5. A conveyor cart, adapted for use with a cutting blade movable to intercept the cart, having a frame comprising a pair of frame pieces, located on opposite sides of the locus of interception of the cart by the blade, and connecting means joining the pair of frame pieces to one another and including severable spacing means joined to and terminating at the near side edges of the frame pieces and holding the frame pieces apart from one another on opposite sides of the locus of interception by the blade, the frame otherwise being essentially free of components in the path of interception by the blade.

6. In a work cart for use with masonry saws or the like having a movable cutting blade, the combination of a substantially planar work bed, a bed-supporting frame comprising a plurality of pieces spaced on opposite sides of a locus of interception of the cart by the cutting blade, each piece having a surface extending substantially parallel to the bed and a surface extending substantially perpendicular to the bed, and readily severable spacing means spaced from the parallel surfaces of the respective frame pieces and joining the perpendicular surfaces of the respective frame pieces and extending across the locus of interception.

7. In a conveyor cart for supporting material to be cut by a blade located to intercept the cart, upon relative movement between the cart and the blade, a pair of frame pieces located on opposite sides of the locus of interception of the cart by the blade, a bed supported on the frame pieces and adapted to support material to be cut by the blade, connecting means for the frame pieces including a plurality of readily severable spacers located substantially entirely between and connected to the respective frame pieces and extending across the locus of interception, the frame pieces being supported in fixed relationship to one another thereby independently of the bed and of substantially all other structurally connected members.

8. Work cart for conveying material to be cut along the locus of interception thereof by the blade of a masonry saw or the like, comprising readily severable spacing means extending across the locus of interception, a frame consisting of a plurality of frame pieces with at least one frame piece on each side of the locus of interception, all the frame pieces being located clear of the locus of interception, means connecting the spacing means to frame pieces located on opposite sides of the locus of interception, the pieces so connected being supported essentially completely thereby, and a work-supporting bed supported by the frame pieces at a location apart from the spacing means.

References Cited in the file of this patent

UNITED STATES PATENTS

| | | |
|---|---|---|
| 2,464,117 | Coates | Mar. 8, 1949 |
| 2,863,441 | Harclerode | Dec. 9, 1958 |

UNITED STATES PATENT OFFICE

CERTIFICATE OF CORRECTION

Patent No. 3,027,885                                  April 3, 1962

Edward A. Zuzelo

It is hereby certified that error appears in the above numbered patent requiring correction and that the said Letters Patent should read as corrected below.

Column 1, line 41, for "masonary" read -- masonry --; line 59, strike out "of"; column 3, line 2, for "from" read -- fro --; column 4, line 19, for "be" read -- both --.

Signed and sealed this 17th day of July 1962.

(SEAL)
.ttest:

RNEST W. SWIDER                                          DAVID L. LADD
.ttesting Officer                                              Commissioner of Patents